Figure 1:
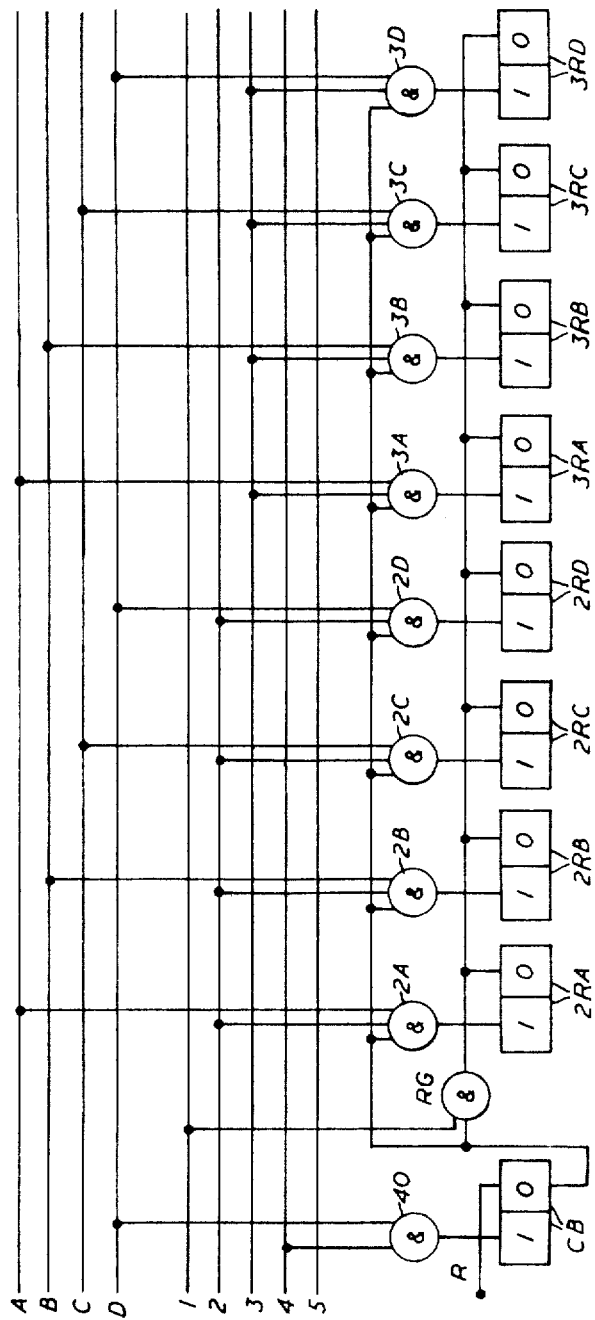

United States Patent Office 3,297,991
Patented Jan. 10, 1967

3,297,991
SIGNAL INFORMATION STORING SYSTEMS
John William Pletts, Galleywood, Essex, England, assignor to The Marconi Company Limited
Filed Nov. 5, 1962, Ser. No. 235,313
Claims priority, application Great Britain, Dec. 11, 1961, 44,219/61
3 Claims. (Cl. 340—172.5)

This invention relates to signal information storing systems and has for its object to provide improved and relatively simple means whereby signal information arriving from a plurality of synchronously operated bit-signal channels in sequences of bits may be automatically registered and stored if the bit signal occurring in a predetermined circuit at a predetermined time is of a predetermined nature.

The primary though not the exclusive application of the invention is to systems in which the synchronously operated bit-signal channels are so-called circulating stores e.g. circulating stores of the mechanical delay line type. One typical known circulating store of this type comprises a wire with a twist-imparting transmitting electro-mechanical transducer at one end (the input end) and a twist-operated receiving mechanico-electrical transducer which is at the other end (the output end) and is operatively coupled back to the transmitting transducer. If the transmitting transducer is fed with a signal to be stored it imparts a twist to the input end of the wire and this twist travels along the wire to the receiving transducer which produces an electrical signal which actuates the transmitting transducer again so that the signal (in the form of a travelling twist in the wire) circulates in the store. If a sequence of signals is fed in to the transmitting transducer the sequence similarly circulates in the store and there will be a number of signals (in the form of travelling twists) at any one time in the wire, the number of signals the wire can simultaneously carry depending on the length of the said wire and other design details. A number of such stores with synchronously operated transmitting transducers may be used to store different items of information in the form of bit-signals. Thus, for example, in certain radar installations deriving information about aircraft under radar surveillance, a number of synchronously and periodically operated circulating stores are employed to receive bit signal information about aircraft under surveillance, each store receiving a sequence of bit signals conveying information of a particular type with regard to one aircraft and then a sequence of the same length conveying information of the same type with regard to another aircraft and so on, the stores between them receiving successive combinations of simultaneous bit signals, the bit signals in any combination conveying information of different types with regard to a particular aircraft and a sequence of combinations conveying the whole available information with regard to that aircraft. A number of circulating stores can hold between them a considerable number of bit-signal combinations in simultaneous circulation, the number of bits in each combination being obviously equal to the number $n$ of stores provided. The bits constituting any one combination may take any of $2^n$ forms since each bit in a combination may be (to use the customary terminology) either a 1 or 0. There often arises in systems of this nature and in other, generally similar, systems the requirement to register and hold the bit signal information in one or more of the combinations in a sequence of combinations if a bit appearing in a predetermined circuit (which may be but need not be itself one of the circulating stores) at a predetermined time in the sequence is of a predetermined nature, e.g. a 1. This presents no difficulties if the said predetermined time occurs before the time or times of recurrence of the bit signal combination or combinations to be registered and held, but if it occurs later in time satisfaction of the requirement is difficult and has hitherto involved considerable complexity and cost of apparatus and circuitry. The present invention seeks to avoid such complexity and cost.

According to this invention a system adapted to register and hold one or more combinations each of a plurality of simultaneously occurring bit-signals derived from a plurality of bit-signal sources and occurring in a predetermined sequence of combinations and to effect such registration and holding automatically when a bit signal occurring in a predetermined circuit at a predetermined time which is later than the time or times of occurrence of the bit-signal combination or combinations to be registered and held comprises at least one group of bistable storing units, one for each bit in a combination to be registered and held; means for registering in the units of said group a combination of bits occurring at a predetermined time in the sequence, means for normally subsequently cancelling registration of a combination thus registered thus preparing said units to register the corresponding combination in the next sequence; means operable automatically on the occurrence of a signal of a predetermined nature in a predetermined circuit at a predetermined time later than the registration of a combination but before the cancellation of said registration for preventing said cancellation so that the combination previously registered is held; and means operable at any desired time for cancelling a registration of a combination thus held.

The predetermined circuit may be a circuit entirely separate from the bit-signal sources but it may be, and more usually will be, one of the bit-signal sources.

Normally it will be required to register and hold a number of combinations and in such cases there will be a plurality of groups of bistable units, one group for each such combination, and the means for normally subsequently cancelling registration will be arranged to effect such cancellation in all the units after the registration of the last combination in a sequence to be registered, the means operable at any desired time being similarly arranged to effect registration cancellation in all the units.

In a preferred embodiment there is employed a bistable control unit having one input fed from the means operable at any time and the other fed from a control "and" gate having one input fed from said predetermined circuit and the other fed from a source of gate pulses occurring at the predetermined times at which said signal of a predetermined nature can occur; a resetting "and" gate having one input fed from said control unit and the other fed from a source of gate pulses occurring at the predetermined times of normal registration cancellation, the output of said resetting "and" gate being supplied to one input of all the storing units thereby to cancel any combination registered thereby; and a plurality of setting "and" gates each supplying output to the remaining input of a different storing unit each of said setting "and" gates having one input fed from one of the bit-signal sources, a second input fed with gating pulses occurring at the times of occurrence of bits to be registered and a third input fed from the control unit.

Figure 2:
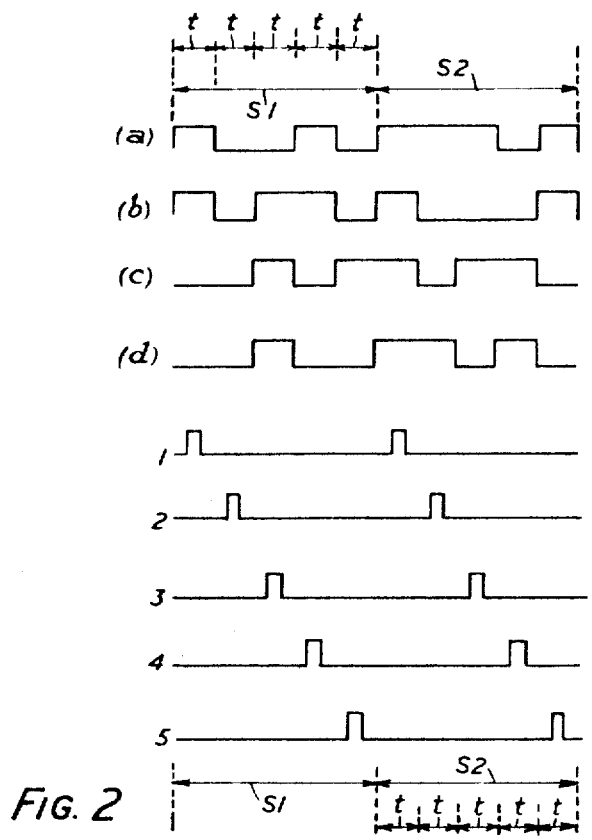

The invention is illustrated in the accompanying drawings in which FIGURE 1 is a schematic diagram of one embodiment and FIGURE 2 is an explanatory graphical figure relating to the operation of the embodiment of FIGURE 1.

Referring to the drawings, a number of circulating bit-signal stores (not shown) constitute bit-signal sources and feed their bit-signal outputs each into different one of a corresponding number of conductors. FIGURE 1 shows four such conductors with terminals marked A, B, C, and D, each being fed from a different store. Lines $a$, $b$, $c$, and $d$ of FIGURE 2 typify in conventional graphical manner the signals which might be fed into the terminals A, B, C, and D respectively. The bit-signal period is the time $t$ and, for example (and as illustrated), five such periods might constitute a sequence. Thus the bit-signal in sequence S1 in line $a$ might convey a certain sort of information with regard to one aircraft under radar surveillance; the bit-signals in sequence S2 in line $a$ might convey the same sort of information with regard to another aircraft under surveillance; the bit-signals in sequence S1 in line $b$ might convey a second sort of information with regard to the first aircraft; the bit-signals in sequence S2 in line $b$ might convey the said second sort of information with regard to the second aircraft and so on. It will be seen that the bit-signal sequence S1 in line $a$ is illustrated as being 10010; that in sequence S1 in line $c$ is shown as 00101. Any of the sequences may, of course, be of any form and those illustrated will now be apparent from FIGURE 2.

FIGURE 1 shows, by way of example, an equipment which, if the fourth bit in a sequence on conductor D is a 1, will register and hold the second and third sequences of combinations of bits on the store fed conductors.

A time gating pulse source (not shown) provides a number of timed periodic gating pulse inputs, one to each of the gating pulse conductors whose terminals are marked 1 to 5 inclusive. There are as many such inputs and gating pulse conductors as there are bits in a bit-sequence the number being, in the case illustrated, 5. The pulses fed to conductor terminals 1, 2, 3, 4 and 5 are shown respectively in the correspondingly reference lines of FIGURE 2. As will be seen, the pulses at terminal 1 are timed to accord with the time of the first bit in a bit-sequence; the pulses at terminal 2 accord in time with the second bit in a sequence and so on.

Terminals D and 4 provide the two inputs to be "and" gate 40 whose output, when present, changes over the state of stability of a bistable control unit CB which can be changed back to its other state at any time by supplying a re-set pulse from a source (not shown) connected at terminal R. The 0 side of the unit CB supplies control input to a resetting "and" gate RG and also to setting "and" gates which are shown as arranged in two groups of four each. One group of setting "and" gates consists of the gates 2A, 2B, 2C and while the other group consists of the gates 3A, 3B, 3C and 3D. Each of these setting "and" gates has three inputs one of which is in all cases from the resetting "and" gate RG. The gates 2A, 2B, 2C and 2D of the first group receive their second inputs from terminal 2 and their third inputs from terminals A, B, C, and D respectively. The gates 3A, 3B, 3C and 3D of the second group receive their second inputs from terminal 3 and their third inputs from terminals A, B, C and D respectively. The second input to the resetting "and" gate RG is from terminal 1.

There are similarly two groups of registering bistable units, the first group consisting of the bistable units 2RA, 2RB, 2RC, and 2RD and the second group consisting of the units 3RA, 3RB, 3RC and 3RD. The units of the first group each receive one of their inputs from a different one of the setting "and" gates of the first group — 2RA from 2A, 2RB from 2B and so on and the units of the second group similarly receive each one input from a different one of the setting "and" gates of the second group — 3RA from 3A, 3RB from 3B and so on. The second inputs to all the registering bistable units are supplied from the resetting "and" gate RG.

The operation is as follows: Suppose the control bistable unit CB is in its zero state. Then so long as this is the case the registering units 2RA, 2RB, 2RC and 2RD of the first group will be "loaded" with the bit-signal combination occurring at the time of occurrence of the gating signals at terminal 2 and the units 3RA, 3RB, 3RC and 3RD of the second group will similarly be "loaded" with the bit-signal combination occurring at the time of the gating signal at terminal 3. If, at the time of occurrence of the immediately following gating signal at terminal 4, the bit-signal at terminal D is a 0 the control gate 40 produces no action and on the occurrence of the following gating pulse at terminal 1 the resetting gate RG operates to re-set all the registering bistable units, i.e. to cancel the registered combinations and leave the said units ready to register again. If, however, following the registration of the two combinations by the two groups of registering bistable units the bit-signal at terminal D is a 1, the control gate 40 operates, the bistable unit CB changes over and the resetting gate RG is unable to re-set the registering bistable units which accordingly hold the registered combinations and, because the setting "and" gates are also "disabled" by the unit CB, can receive no more combinations. By applying a re-setting pulse at R the unit CB can be at any time changed back again and the original set of conditions restored.

FIGURE 1 is, for simplicity of drawing, only a partial view and only two groups of setting "and" gates and two groups of registering bistable units are actually shown. Also, automatic holding of registered combinations is not necessarily effected by the occurrence of a 1 as the fourth bit of a sequence at terminal D, for obviously other arrangements are possible, e.g. the occurrence of a 1 as the fifth bit of a sequence at terminal D could be caused to bring about automatic holding of registered combination. Because FIGURE 1 is only a partial view the conductor connected to terminal 5 appears with no other connections thereto.

I claim:

1. A system adapted to register and hold one or more combinations each of a plurality of simultaneously occurring bit-signals derived from a plurality of bit-signal sources and occurring in a predetermined sequence of combinations and to effect such registration and holding automatically when a bit-signal occurring in a predetermined circuit at a predetermined time which is later than the time or times of occurrence of the bit-signal combination or combinations to be registered and hold said system including at least one group of bistable storing units, one for each bit in a combination to be registered and held; means for registering in the units of said group a combination of bits occurring at a predetermined time in the sequence means for normally subsequently cancelling registration of a combination thus registered thus preparing said units to register the corresponding combination in the next sequence; means operable automatically on the occurrence of a signal of a predetermined nature in a predetermined circuit at a predetermined time later than the registration of a combination but before the cancellation of said registration for preventing said cancellation so that the combination previously registered is held; and means operable at any desired time for cancelling a registration of a combination thus held, said predetermined circuit being constituted by one of the bit-signal sources.

2. A system as claimed in claim 1 further including means adapted to hold a number of combinations and wherein there is a plurality of groups of bistable units, one group for each such combination, and the means for normally subsequently cancelling registration are arranged to effect such cancellation in all the units after the registration of the last combination in a sequence to be registered, the means operable at any desired time being similarly arranged to effect registration cancellation in all the units.

3. A system as claimed in claim 1 including a bistable control unit having one input fed from the means operable at any time and the other fed from a control "and" gate having one input fed from said predetermined circuit and the other fed from a source of gate pulses occurring at the predetermined times at which said signal of a predetermined nature can occur; a resetting "and" gate having one input fed from said control unit and the other fed from a source of gate pulses occurring at the predetermined times of normal registration cancellation, the output of said resetting "and" gate being supplied to one input of all the storing units thereby to cancel any combination registered thereby; and a plurality of setting "and" gates each supplying output to the remaining input of a different storing unit each of said setting "and" gates having one input fed from one of the bit-signal sources, a second input fed with gating pulses occurring at the times of occurrence of bits to be registered and a third input fed from the control unit.

References Cited by the Examiner

UNITED STATES PATENTS

| | | | |
|---|---|---|---|
| 2,750,580 | 6/1956 | Rabenda | 340—172.5 |
| 2,903,513 | 9/1959 | Phelps | 340—172.5 |
| 2,997,704 | 8/1961 | Gordon | 340—172.5 |
| 3,067,937 | 12/1962 | Hinkein | 340—172.5 |
| 3,076,181 | 1/1963 | Newhouse | 340—172.5 |
| 3,117,220 | 1/1964 | Wensley | 340—172.5 |
| 3,168,724 | 2/1965 | Anderson | 340—172.5 |

ROBERT C. BAILEY, *Primary Examiner.*

P. L. BERGER, *Assistant Examiner.*